(12) United States Patent
Balbi et al.

(10) Patent No.: US 8,931,625 B2
(45) Date of Patent: Jan. 13, 2015

(54) GLASS SHEET BELT CONVEYOR

(75) Inventors: Mario Balbi, Cuneo (IT); Giorgio Bisol, Giaveno (IT)

(73) Assignee: Bottero S.p.A., Cuneo (IT)

( * ) Notice: Subject to any disclaimer, the term of this patent is extended or adjusted under 35 U.S.C. 154(b) by 0 days.

(21) Appl. No.: 13/403,438

(22) Filed: Feb. 23, 2012

(65) Prior Publication Data

US 2012/0211332 A1 Aug. 23, 2012

(30) Foreign Application Priority Data

Feb. 23, 2011 (IT) ................. TO2011A0152

(51) Int. Cl.
*B65G 15/58* (2006.01)
*B65G 49/06* (2006.01)
*B65G 21/20* (2006.01)

(52) U.S. Cl.
CPC .......... *B65G 49/061* (2013.01); *B65G 21/2036* (2013.01); *B65G 49/064* (2013.01); *B65G 2249/045* (2013.01)
USPC ...................................................... 198/689.1

(58) Field of Classification Search
CPC ............................ B65G 49/061; B65G 49/064
USPC ...................................................... 198/689.1
See application file for complete search history.

(56) References Cited

U.S. PATENT DOCUMENTS

| 3,477,558 | A | | 11/1969 | Fleischauer | |
|---|---|---|---|---|---|
| 4,555,013 | A | * | 11/1985 | Franklin | 198/689.1 |
| 6,823,986 | B2 | * | 11/2004 | Vogel | 198/689.1 |
| 7,036,656 | B2 | * | 5/2006 | Gariglio | 198/689.1 |
| 8,485,347 | B2 | * | 7/2013 | Jackels | 198/689.1 |
| 2001/0052449 | A1 | * | 12/2001 | Emery | 198/602 |
| 2002/0121427 | A1 | * | 9/2002 | Margaria | 198/689.1 |

FOREIGN PATENT DOCUMENTS

| DE | 1929183 | 12/1970 |
|---|---|---|
| DE | 1929183 A1 | 12/1970 |
| EP | 1205408 | 5/2002 |
| JP | 62175309 | 8/1987 |

OTHER PUBLICATIONS

Italian Search Report dated Oct. 11, 2011 for application No. TO20110152.
International Search Report dated Oct. 11, 2011 for application No. TO20110152.

* cited by examiner

*Primary Examiner* — Gene Crawford
*Assistant Examiner* — Thomas Randazzo
(74) *Attorney, Agent, or Firm* — Ohlandt Greeley Ruggiero & Perle L.L.P.

(57) ABSTRACT

A powered draw belt of a belt conveyor for conveying glass sheets has a main supporting surface, and is fitted with a suction retaining device for securing a glass sheet to the draw belt; the retaining device having at least one hollow body at least partly covering the main supporting surface; the hollow body defining a supporting surface for the glass sheet, and having at least one elastically deformable portion spaced apart from the main supporting surface to define, with the main supporting surface, a variable-volume chamber connectable to a suction source.

7 Claims, 5 Drawing Sheets

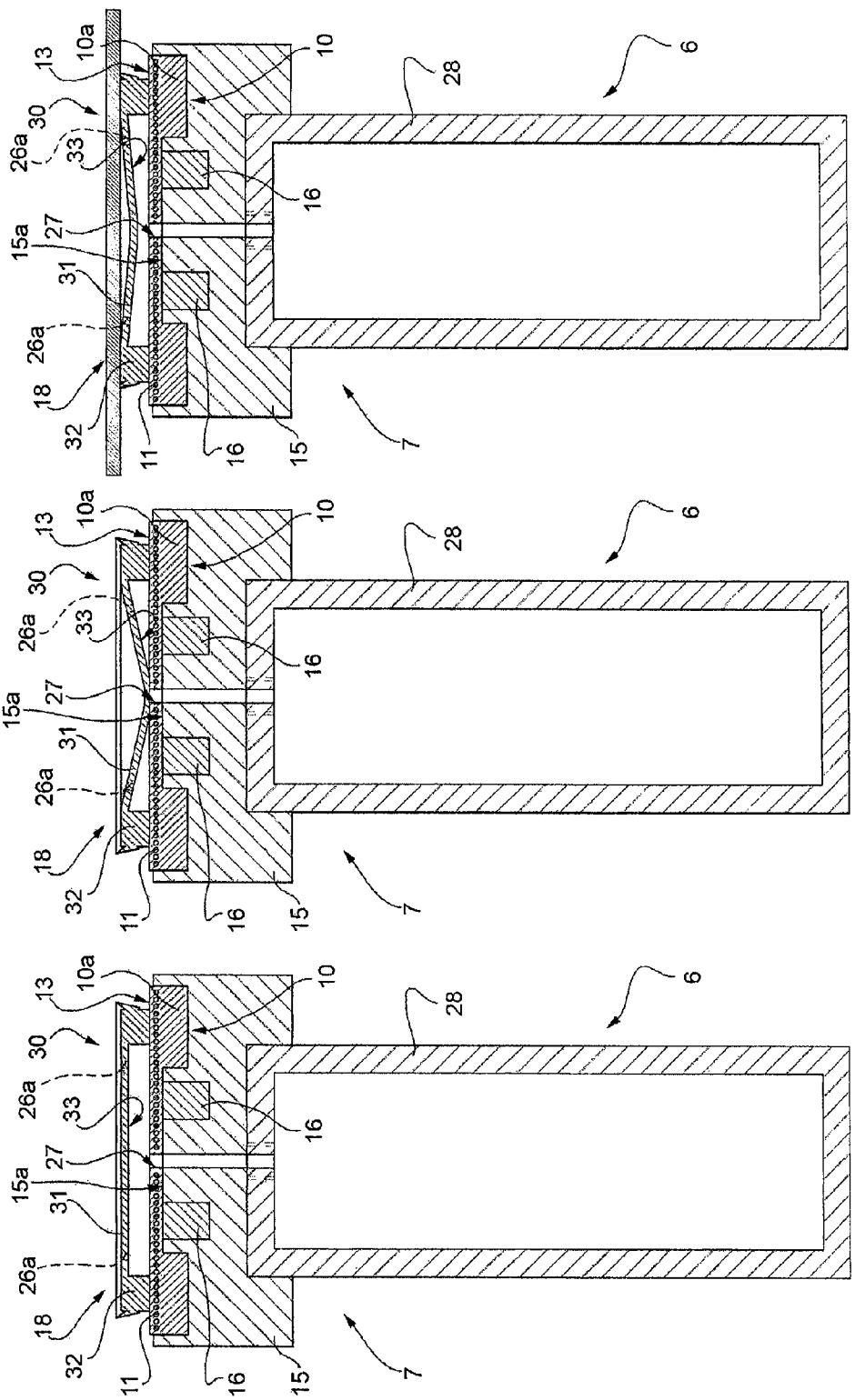

GLASS SHEET BELT CONVEYOR

CROSS REFERENCE TO RELATED APPLICATIONS

This application claims benefit under 35 U.S.C. §119(a) of Italian Patent Application No. TO2011A 000152, filed Feb. 23, 2011, the entire contents of which are incorporated herein by reference.

The present invention relates to a glass sheet belt conveyor.

The present invention is particularly, though not exclusively, advantageous for use on glass sheet grinding and/or drilling machines, to which the following description refers purely by way of example.

BACKGROUND OF THE INVENTION

As is known, a grinding/drilling machine comprises one or more machining heads; and a feed assembly for feeding the work sheet along a grinding path, or holding the sheet in a given reference position.

Known feed assemblies normally comprise one or more pairs of belt conveyors; each conveyor comprises a draw belt, which defines a supporting surface for the work sheet and has a row of recesses, each formed through the draw belt and having an opening that comes out on the supporting surface and is closed in use by the glass sheet; and each recess is bounded by a bottom wall, in which are formed one or more passages connecting the recess to a suction source.

In actual use, depending on the size of the sheets and/or the distance between consecutive sheets on the conveyor, at least one and normally more than one of the recesses often remain partly or even fully open. And, given the degree of contamination of the workplace by dust and/or glass grinding chips and/or coolant, it is only a matter of time before the recesses become clogged, thus gradually impairing the ability of the conveyor to retain the sheet. For this reason, known conveyors must be thoroughly cleaned every so often, which involves both direct labour and indirect downtime expense.

Moreover, despite the suction in each recess or group of recesses being controlled according to the location of the recesses, the fact that some of them are often fully open greatly increases suction air consumption, at considerable cost over time, and at any rate makes it necessary to employ high-performance suction systems.

Lastly, the presence, and especially the size of the openings in the recesses, result in local weakening of the draw belt.

SUMMARY OF THE INVENTION

It is an object of the present invention to provide a glass sheet belt conveyor designed to provide a simple, low-cost solution to the above drawbacks.

According to the present invention, there is provided a belt conveyor for conveying glass sheets; the conveyor comprising a powered draw belt having a main supporting surface, and suction retaining means for securing a glass sheet to said draw belt; the conveyor being characterized in that said retaining means comprise at least one hollow body resting on and at least partly covering said main supporting surface; said hollow body defining a supporting surface for supporting said glass sheet, and which is spaced apart from said main supporting surface, and comprises at least one elastically deformable portion facing and spaced apart from said main supporting surface, and defining, with said main supporting surface, a variable-volume chamber connectable to a suction source.

BRIEF DESCRIPTION OF THE DRAWINGS

A non-limiting embodiment of the present invention will be described by way of example with reference to the accompanying drawings, in which:

FIGS. 5a, 5b and 5c show a larger-scale, front view, as in FIG. 3, of the FIG. 4 detail in three different operating conditions.

DETAILED DESCRIPTION OF THE INVENTION

Figure 1:
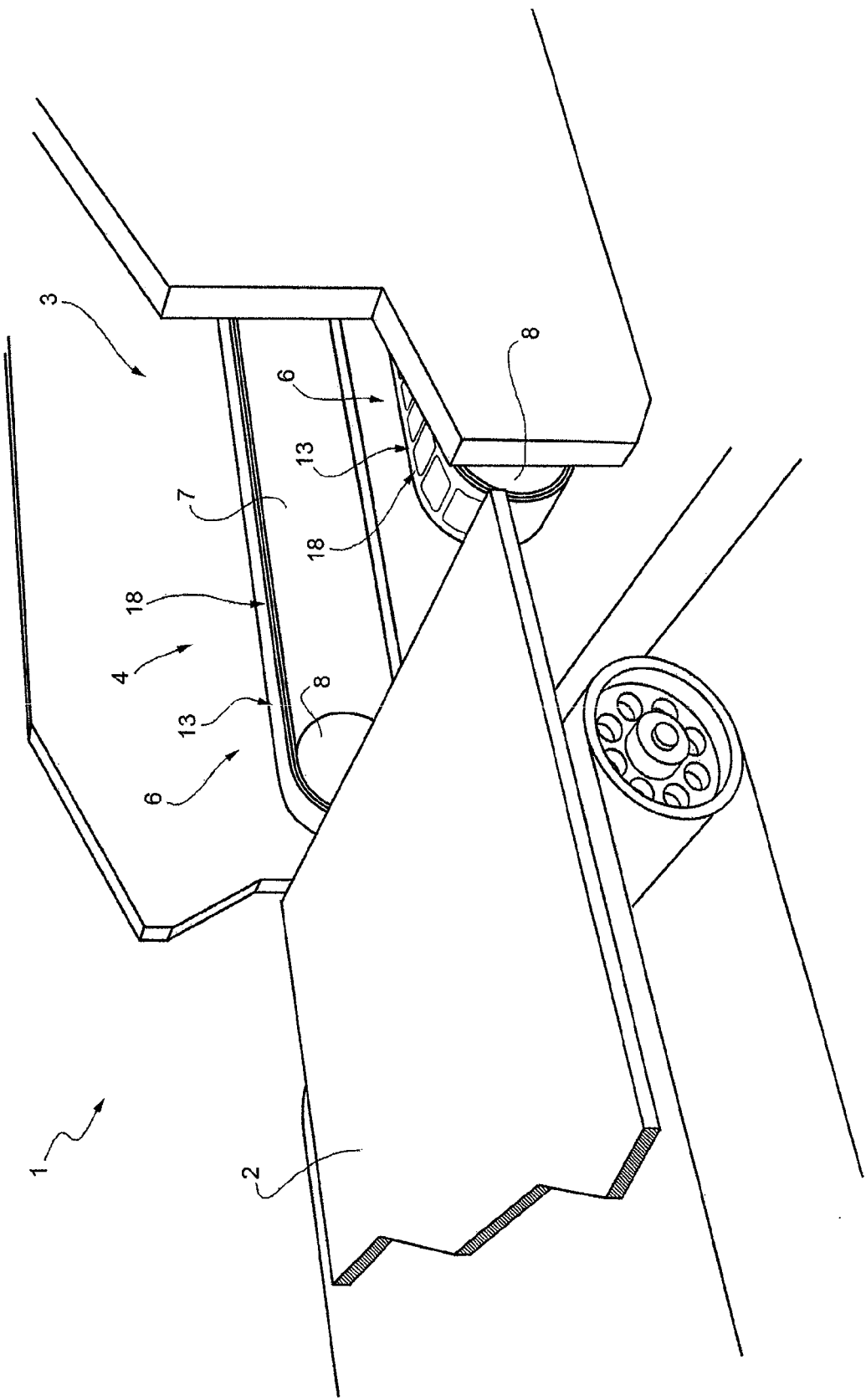
FIG. 1 shows a schematic, substantially in blocks, of a glass sheet working machine featuring two belt conveyors in accordance with the teachings of the present invention.

Number 1 in FIG. 1 indicates as a whole a machine, e.g. a grinder, for machining a glass sheet 2.

Machine 1 comprises a machining station 3 for machining glass sheet 2; and a conveyor 4 for feeding glass sheet 2 through machining station 3.

In the example shown, conveyor 4 comprises two belt conveyors 6, each comprising a hollow supporting frame 7, at least two pulleys 8 (only one shown in FIG. 1), and a powered draw belt 10 looped about pulleys 8 and reinforced with a number of side by side steel strands 11 spaced widthwise of draw belt 10. In an alternative variation not shown, the strands are at least partly replaced with steel mesh or other equivalent metal reinforcing material.

Belt 10 is bounded externally by a main supporting surface 13 facing glass sheet 2 in use, and has a delivery branch 10a, which is maintained contacting a top surface 15a of a fixed reference body 15 of frame 7 by a number of magnetic bodies 16 connected integrally to fixed body 15.

Each draw belt 10 supports a suction retaining device 18 for securing glass sheet 2 to draw belt 10.

Figure 2:
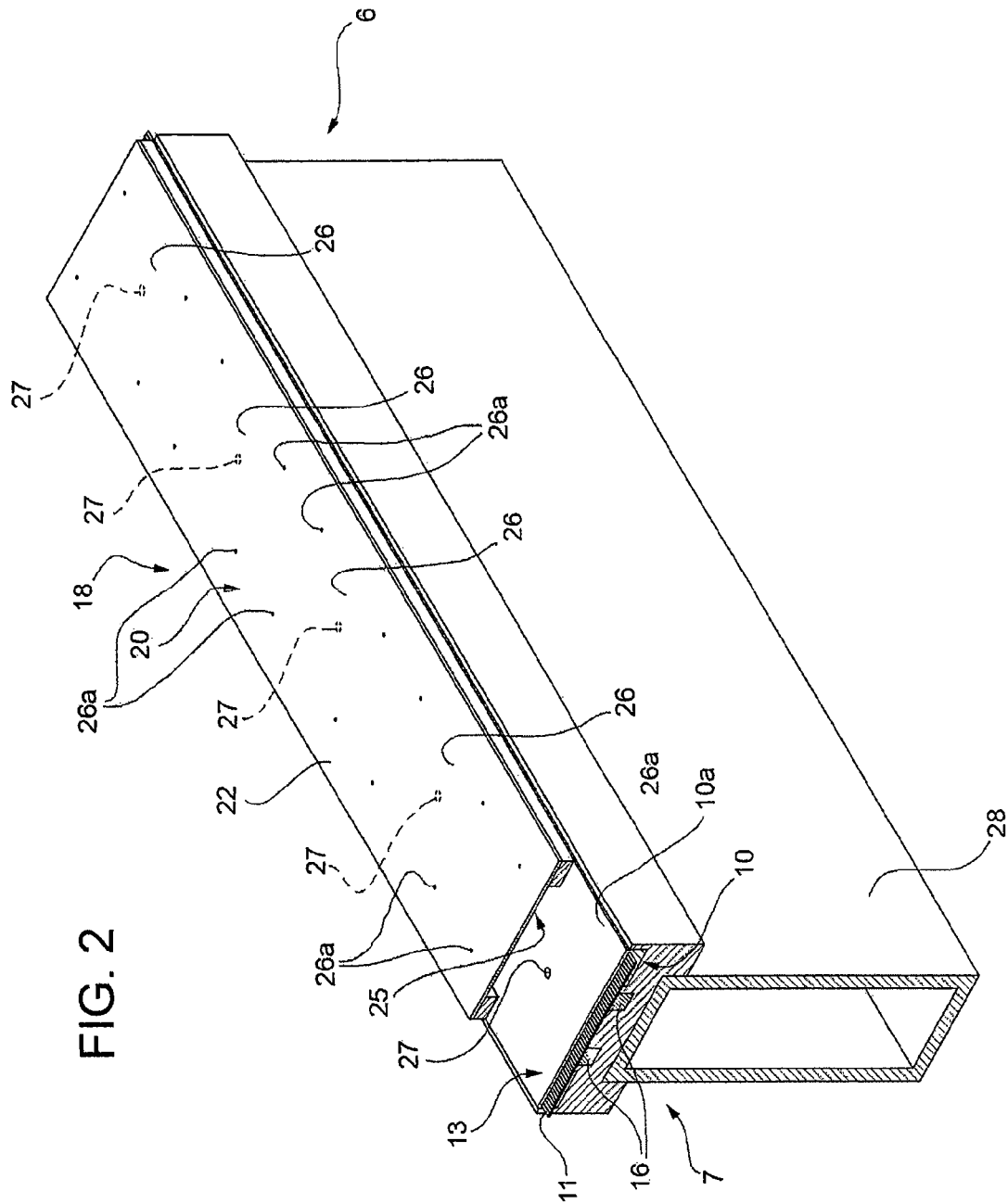
FIG. 2 shows a larger-scale view in perspective of a detail in FIG. 1.
Figure 3:
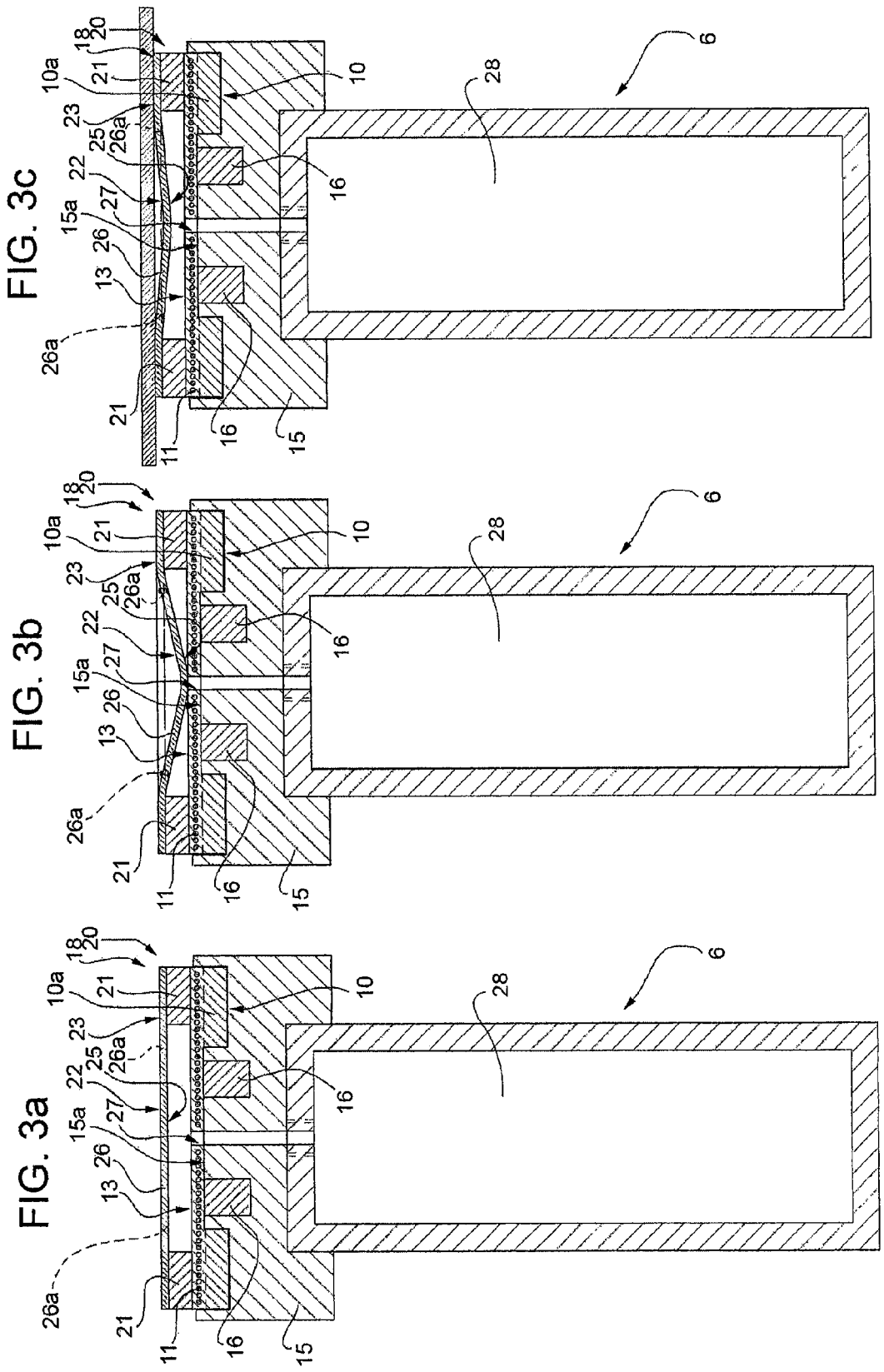
FIGS. 3a, 3b and 3c show a larger-scale, front view of the FIG. 2 detail in three different operating conditions.

As shown in FIGS. 2 and 3, device 18 comprises an annular body 20 surrounding draw belt 10 to completely cover main supporting surface 13 of draw belt 10, and integral with, e.g. glued or pressure cast to, draw belt 10.

In the example shown, annular body 20 comprises two lateral portions or sides 21 resting on lateral portions of main supporting surface 13; and a rubber-coated annular portion 22, which surrounds sides 21, at a distance from main supporting surface 13, and defines a supporting surface 23 for supporting glass sheet 2 and parallel to and spaced apart from main supporting surface 13.

In a first embodiment, rubber-coated portion 22 is separate from sides 21, and is connected in fluidtight manner to sides 21 in known manner. Alternatively, rubber-coated portion 22 and sides 21 form part of a one-piece body. In both cases, sides 21 are connected in fluidtight manner to main supporting surface 13 to define an airtight chamber 25 together with belt 10 and rubber-coated portion 22.

In both cases, rubber-coated portion 22 comprises a number of elastically deformable membrane portions 26, each of which is located at a respective hole 27 formed through belt 10 to connect chamber 25 to a vacuum tank 28 connected to a known suction source not shown. Each membrane portion 26 comprises one or more through holes 26a connecting variable-volume chamber 25 to the outside. Holes 26a are much smaller in diameter than holes 27, have cross sections only allowing passage of a pressure signal, and are formed eccentrically with respect to holes 27, conveniently next to an outer peripheral edge of respective membrane portions 26, as shown in FIGS. 3 and 5. In a variation not shown, portions 26 have no holes 26a.

Each membrane portion 26 is designed so that it is positioned coplanar with the rest of belt 10, and therefore contacting glass sheet 2, in the absence of a vacuum in chamber 25 (FIGS. 2 and 3a), or rests partly on main supporting surface 13 to close relative hole 27, in the absence of glass sheet 2 (FIG. 3b), or is set to an intermediate position retaining glass sheet 2 (FIG. 3c).

Figure 4:
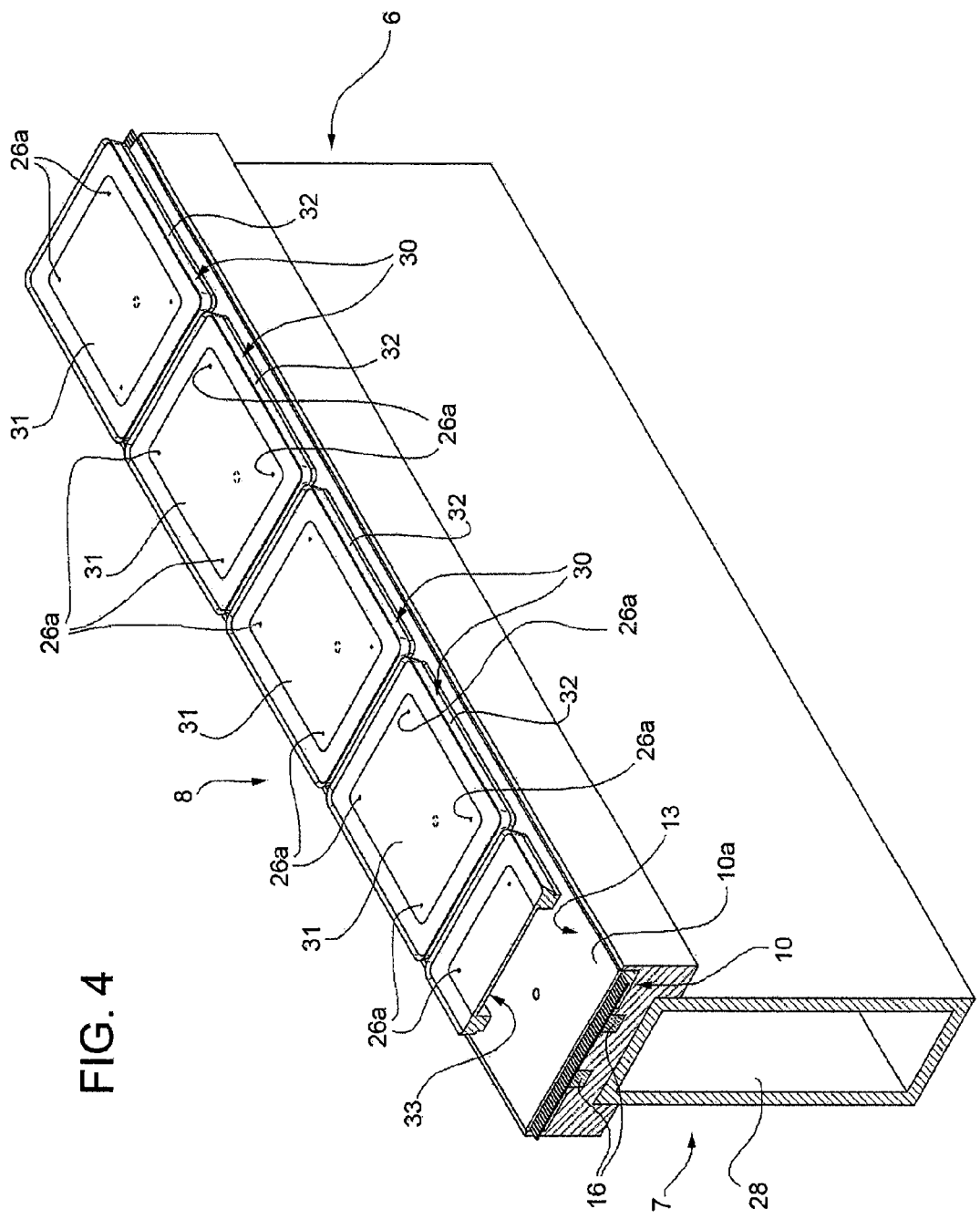
FIG. 4 shows a larger-scale view in perspective of a further detail in FIG. 1.

In the FIGS. 4 and 5 variation, annular body 20 is replaced with a number of hollow bodies 30 aligned along draw belt 10 and spaced apart in the travelling direction of draw belt 10. Each hollow body 30 is conveniently parallelepiped-shaped or in the form of a hollow plate, has a concavity facing main supporting surface 13, is formed in one piece from elastomeric material, and comprises a bottom wall 31 defining one of elastically deformable portions 26; and a lateral wall 32, which surrounds a respective hole 27 and is positioned resting on and fitted in fluidtight manner to main supporting surface 13 to define a relative variable-volume chamber 33.

In another variation, not shown, each body 30 comprises an annular body defining lateral wall 32; and an elastically deformable bottom plate separate from the annular body and fitted to it in known fluidtight manner, e.g. glued or using other equivalent connecting means.

Belt conveyor 6 described is therefore unaffected by external contaminants, i.e. dust, glass chips and/or coolant, due to suction holes 27, unlike known solutions, being isolated from the outside at all times. That is, holes 27 communicate at all times with a chamber which, when a glass sheet is present, is closed by the glass sheet, and, when there is no glass sheet, is cut off from the suction source by relative portion 26. The sheet retaining capacity of conveyors 6 therefore remains practically unchanged, with no need for any particular routine maintenance. Moreover, when idle, i.e. with no vacuum in the chambers, the surface supporting the glass sheet is flat, so any foreign bodies and/or contaminants can be cleaned off easily.

Moreover, when chambers 25 and 33 are in vacuum mode, and there are either no glass sheets on the conveyor or they only partly overlap one or more deformable portions 26, deformable portions 26 are always positioned closing respective holes 27, regardless of the position of deformable portions 26 along the path of glass sheets 2, thus greatly reducing air consumption.

Unlike known solutions, the conveyors described are also unaffected by the load and/or sudden changes in the load being conveyed, in that this is absorbed by draw belt 10, which is homogeneous and reinforced with substantially no change in its pull-resisting section.

Finally, holes 26a improve the sheet retaining force of the conveyor.

Clearly, changes may be made to conveyor 6 without, however, departing from the protective scope of Claim 1. More specifically, bodies 20 and 30 covering the sheet 2 supporting surface may be designed differently, and fitted differently to draw belt 10, from those described by way of example, while still serving to connect integrally to draw belt 10 a sheet supporting surface other than the main supporting surface of draw belt 10.

The invention claimed is:

1. A belt conveyor for conveying glass sheets, the belt conveyor comprising:
    a powered draw belt having a main supporting surface; and
    suction retaining means for securing a glass sheet to said powered draw belt that comprises a number of hollow bodies aligned along said powered draw belt and spaced apart in a traveling direction of the powered draw belt, each of said hollow bodies comprising:
        an elastically deformable portion comprising a bottom wall;
        a lateral wall configured around and enclosing the perimeter of the bottom wall, the lateral wall attached to said main supporting surface of said powered draw belt; and
        a variable-volume chamber connectable to a suction source, the variable-volume chamber formed by said lateral wall enclosing and vertically spacing said bottom wall apart from said main supporting surface.

2. A conveyor as claimed in claim 1, further comprising a reference body bounded by a supporting surface of said powered draw belt, wherein said powered draw belt is fitted with metal members, and wherein magnetic means, for retaining said metal members, is provided to keep said powered draw belt in contact with said reference body.

3. A conveyor as claimed in claim 1, wherein said lateral wall comprises an annular body and said bottom wall comprises an elastically deformable bottom plate separate from the annular body and fitted to the annular body in a fluidtight manner, and wherein said lateral wall surrounds a respective hole in the main supporting surface of said draw belt for communicating to the suction source.

4. A conveyor as claimed in claim 1, wherein each of said hollow bodies has a concavity facing said main supporting surface, and wherein each of said hollow bodies comprises said lateral wall surrounding a respective hole in the main supporting surface of said powered draw belt for communicating to the suction source and positioned resting on and fitted in a fluidtight manner to said main supporting surface.

5. A conveyor as claimed in claim 4, wherein said elastically deformable portion is movable between two limit positions, one of which closing said respective hole, and through an intermediate position retaining said glass sheet.

6. A conveyor as claimed in claim 5, wherein said lateral wall rests directly on said main supporting surface.

7. A belt conveyor for conveying glass sheets, the belt conveyor comprising:
    a powered draw belt having a main supporting surface;
    suction retaining means for securing a glass sheet to said powered draw belt, the suction retaining means comprising a number of hollow bodies aligned along said powered draw belt and spaced apart in a traveling direction of said powered draw belt, said hollow bodies resting on and at least partly covering said main supporting surface, each of said hollow bodies defining a supporting surface for supporting said glass sheet, and which is spaced apart from said main supporting surface, and comprises at least one elastically deformable portion facing and spaced apart from said main supporting surface, and defining, with said main supporting surface, a respective variable-volume chamber connectable to a suction source, each of said hollow bodies comprising a bottom wall defining one of said elastically deformable portions and a lateral wall surrounding a respective hole in the main supporting surface of said powered draw belt for communicating to the suction source and positioned resting on and fitted in a fluidtight manner to said main supporting surface; and
    at least one further hole formed through each said elastically deformable portion to connect said variable-volume chamber to the outside, wherein said one further hole is eccentric with respect to said respective hole connecting said variable-volume chamber to said suction source.

* * * * *